US008798372B1

(12) United States Patent
Korchev et al.

(10) Patent No.: US 8,798,372 B1
(45) Date of Patent: Aug. 5, 2014

(54) METHOD FOR DETECTING BRIDGES USING LIDAR POINT CLOUD DATA

(75) Inventors: Dmitriy Korchev, Irvine, CA (US); Swarup Medasani, Thousand Oaks, CA (US); Yuri Owechko, Newbury Park, CA (US)

(73) Assignee: HRL Laboratories, LLC, Malibu, CA (US)

( * ) Notice: Subject to any disclaimer, the term of this patent is extended or adjusted under 35 U.S.C. 154(b) by 168 days.

(21) Appl. No.: 13/414,391

(22) Filed: Mar. 7, 2012

(51) Int. Cl.
*G06K 9/46* (2006.01)

(52) U.S. Cl.
USPC ............................................. 382/195

(58) Field of Classification Search
None
See application file for complete search history.

(56) References Cited

U.S. PATENT DOCUMENTS

| | | | | |
|---|---|---|---|---|
| 2007/0160282 | A1* | 7/2007 | Nightingale et al. | 382/152 |
| 2009/0304236 | A1* | 12/2009 | Francini et al. | 382/109 |
| 2009/0310867 | A1* | 12/2009 | Matei et al. | 382/195 |
| 2010/0128950 | A1* | 5/2010 | Woods et al. | 382/131 |
| 2010/0209013 | A1* | 8/2010 | Minear et al. | 382/260 |
| 2011/0254833 | A1* | 10/2011 | McDaniel et al. | 345/419 |
| 2012/0121161 | A1* | 5/2012 | Eade et al. | 382/153 |
| 2012/0155777 | A1* | 6/2012 | Schweiger et al. | 382/207 |
| 2013/0080111 | A1* | 3/2013 | Dunik et al. | 702/152 |

OTHER PUBLICATIONS

Segmentation of Building Models from Dense 3D point-clouds. Joachim Bauer, Konrad Karner, Konrad Schindler, Andreas Klaus, Christopher Zach. CiteSeerX 2003.*

Martin A. Fischler and Robert C. Bolles (Jun. 1981). "Random Sample Consensus: A Paradigm for Model Fitting with Applications to Image Analysis and Automated Cartography" Comm. of the ACM 24: 381-395.

C. Toth, "Alborne Lidar Technology: The state-of-the-art and future trends," The Center for Mapping, the Ohio State University, published in Latin American Remote Sensing Week (LARS), isprs 2010.

Canny, J., A Computational Approach To Edge Detection, IEEE Trans. Pattern Analysis and Machine Intelligence, 8 (6):679-698. 1986.

Duda, R. O. and P. E. Hart, "Use of the Hough Transformation to Detect Lines and Curves in Pictures," Comm. ACM, vol. 15, pp. 11-15 (Jan. 1972).

P.V.C. Hough, Machine Analysis of Bubble Chamber Pictures, Proc. Int. Conf. High Energy Accelerators and Instrumentation, 1959.

George Sithole and George Vosselman, "Bridge detection in airborne laser scanner data", ISPRS Journal of Photogrammetry and Remote Sensing vol. 61, Issue 1, Oct. 2006, pp. 33-46.

Xuelian Meng, Nate Currit, and Kaiguang Zhao, "Ground Filtering Algorithms for Airborne LiDAR Data: A Review of Critical Issues", Remote Sensing 2010, 2, 833-860.

\* cited by examiner

*Primary Examiner* — Stephen R Koziol
*Assistant Examiner* — Delomia Gilliard
(74) *Attorney, Agent, or Firm* — Tope-McKay & Associates

(57) ABSTRACT

Described is a system and method for detecting elevated structures, such as bridges and overpasses, in point cloud data. A set of data from a three-dimensional point cloud of a landscape is received by the system. The set of data points comprises inlier data points and outlier data points. The inlier data points in the three-dimensional point cloud data are identified and combined into at least one segment. The segment is converted into an image comprising at least one image level. Each image level is processed with an edge detection algorithm to detect elevated edges. The elevated edges are vectorized to identify an elevated structure of interest in the landscape. The present invention is useful in applications that require three-dimensional sensing systems, such as autonomous navigation and surveillance applications.

18 Claims, 13 Drawing Sheets

METHOD FOR DETECTING BRIDGES USING LIDAR POINT CLOUD DATA

BACKGROUND OF THE INVENTION (1) Field of Invention

The present invention relates to a system for automatic detection of elevated structures and, more particularly, to a system for automatic detection of elevated structures in three-dimensional Light Detection and Ranging (LIDAR) point clouds.

(2) Description of Related Art

Light Detection and Ranging (LIDAR) is an optical remote sensing technology that can measure the distance to (or other properties of) a target by illuminating the target with light, typically using pulses from a laser. The ability to automatically detect and recognize elevated physical structures, such as bridges and overpasses, has many applications, including surveillance of a region and mission planning. Some of the current approaches for detecting elevated structures are based on explicit geometrical features and finite state cueing machines.

A geometric bridge detection algorithm proposed by Sithole and Vosselman in "Bridge detection in airborne laser scanner data", in International Society for Photogrammetry and Remote Sensing (ISPRS) Journal of Photogrammetry and Remote Sensing, Volume 61, Issue 1, October 2006, 33-46 is based on the idea that features can be detected in a landscape based on cross-sections (i.e., profiles) in a landscape. The topological information contained in the cross-sections is used to identify seed bridge points. The seed bridge points are then used to detect individual bridges.

In another reference, Meng et al. in "Ground Filtering Algorithms for Airborne LiDAR Data: A Review of Critical Issues" in Remote Sensing 2010, 2, 833-860 use a multi-directional Ground Filter (MGF) for bridge detection. The reference indicates that, for certain filters (e.g., one-dimensional scanning filters), bridges may cause difficulty because they are smoothly connected with ground surfaces.

The approaches described above are based on explicit geometrical features and finite state cueing machines that do not provide adequate detection accuracy. These approaches produce significant rates of miss detections and false alarms. Thus, a continuing need exists for a system for automatic detection of elevated structures that is not based on explicit geometrical features and provides better detection accuracy than the prior art.

SUMMARY OF THE INVENTION

The present invention relates to a system for detecting elevated structures comprising one or more processors and a memory having instructions such that when the instructions are executed, the one or more processors perform operations of first receiving a set of data from a three-dimensional point cloud of a landscape. The set of data points comprises inlier data points and outlier data points. The system then identifies the inlier data points in the three-dimensional point cloud data and combines the inlier data points into at least one segment. The at least one segment is converted into an image comprising at least one image level. Next, each image level is processed with an edge detection algorithm to detect elevated edges. Finally, the elevated edges are vectorized to identify an elevated structure of interest in the landscape.

In another aspect, the system further performs an operation of dividing the three-dimensional point cloud into a plurality of small point clouds using a sliding window that shifts along the three-dimensional point cloud to produce a new sliding window position. Each of the small point clouds overlaps with at least one adjacent small point cloud. The three-dimensional point cloud comprises an x coordinate and a y coordinate, and Ox and Oy represent overlaps between adjacent small point clouds along the x coordinate and the y coordinate, respectively. Each new sliding window position is shifted along the x coordinate by Ox, and each new sliding window position is shifted along the y coordinate by Oy until the entire three-dimensional point cloud is processed.

In another aspect, the system further performs operations of determining a density of data points D in each new sliding window position of a small point cloud. The density of data points D is compared to a predetermined threshold, such that when the density of data points D exceeds the predetermined threshold, the small point cloud is decimated. The data points in each new sliding window position are processed with a random sample consensus (RANSAC) algorithm to detect at least one plane comprising current inlier data points. The system then determines whether an overlap exists between the current inlier data points and the inlier data points of the at least one segment, producing overlapping inlier data points.

In another aspect, the system further performs an operation of adding the current inlier data points to the at least one segment when the number of overlapping inlier data points is greater than a predetermined threshold.

In another aspect, the system further performs an operation of creating a new segment from the current inlier data points when the number of overlapping inlier data points is less than a predetermined threshold.

In another aspect, the system further performs an operation of filtering the at least one segment when the at least one segment is smaller than a predetermined threshold or discontinuous, wherein segments that are smaller than the predetermined threshold or discontinuous do not represent elevated structures of interest in the landscape.

As can be appreciated by one in the art, the present invention also comprises a method for causing a processor to perform the operations described herein.

As can be appreciated by one in the art, the present invention also comprises a computer program product comprising computer-readable instruction means stored on a non-transitory computer-readable medium that are executable by a computer having a processor for causing the processor to perform the operations described herein.

BRIEF DESCRIPTION OF THE DRAWINGS

The objects, features and advantages of the present invention will be apparent from the following detailed descriptions of the various aspects of the invention in conjunction with reference to the following drawings, where.

DETAILED DESCRIPTION

Figure 1:
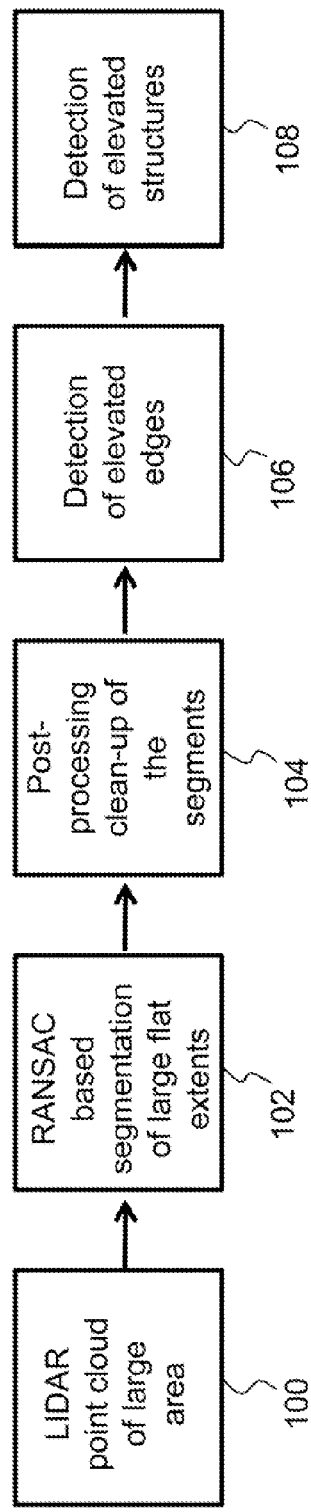
FIG. 1 is a block diagram of a method for detecting elevated structures according to the present invention.

The present invention relates to a system for automatic detection of elevated structures and, more particularly, to a system for automatic detection of elevated structures in three-dimensional Light Detection and Ranging (LIDAR) point clouds. The following description is presented to enable one of ordinary skill in the art to make and use the invention and to incorporate it in the context of particular applications. Various modifications, as well as a variety of uses, in different applications will be readily apparent to those skilled in the art, and the general principles defined herein may be applied to a wide range of embodiments. Thus, the present invention is not intended to be limited to the embodiments presented, but is to be accorded with the widest scope consistent with the principles and novel features disclosed herein.

In the following detailed description, numerous specific details are set forth in order to provide a more thorough understanding of the present invention. However, it will be apparent to one skilled in the art that the present invention may be practiced without necessarily being limited to these specific details. In other instances, well-known structures and devices are shown in block diagram form, rather than in detail, in order to avoid obscuring the present invention.

The reader's attention is directed to all papers and documents which are filed concurrently with this specification and which are open to public inspection with this specification, and the contents of all such papers and documents are incorporated herein by reference. All the features disclosed in this specification, (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Furthermore, any element in a claim that does not explicitly state "means for" performing a specified function, or "step for" performing a specific function, is not to be interpreted as a "means" or "step" clause as specified in 35 U.S.C. Section 112, Paragraph 6. In particular, the use of "step of" or "act of" in the claims herein is not intended to invoke the provisions of 35 U.S.C. 112, Paragraph 6.

Please note, if used, the labels left, right, front, back, top, bottom, forward, reverse, clockwise and counter-clockwise have been used for convenience purposes only and are not intended to imply any particular fixed direction. Instead, they are used to reflect relative locations and/or directions between various portions of an object. As such, as the present invention is changed, the above labels may change their orientation.

(1) Principal Aspects

The present invention has three "principal" aspects. The first is a system for automatic detection of elevated structures. The system is typically in the form of a computer system, computer component, or computer network operating software or in the form of a "hard-coded" instruction set. This system may take a variety of forms with a variety of hardware devices and may include computer networks, handheld computing devices, cellular networks, satellite networks, and other communication devices. As can be appreciated by one skilled in the art, this system may be incorporated into a wide variety of devices that provide different functionalities. The second principal aspect is a method for automatic detection of elevated structures. The third principal aspect is a computer program product. The computer program product generally represents computer-readable instruction means (instructions) stored on a non-transitory computer-readable medium such as an optical storage device, e.g., a compact disc (CD) or digital versatile disc (DVD), or a magnetic storage device such as a floppy disk or magnetic tape. Other, non-limiting examples of computer-readable media include hard disks, read-only memory (ROM), and flash-type memories.

The term "instruction means" as used with respect to this invention generally indicates a set of operations to be performed on a computer, and may represent pieces of a whole program or individual, separable, software modules. Non-limiting examples of "instruction means" include computer program code (source or object code) and "hard-coded" electronics (i.e. computer operations coded into a computer chip). The "instruction means" may be stored in the memory of a computer or on a non-transitory computer-readable medium such as a floppy disk, a CD-ROM, and a flash drive.

(2) Specific Details

The present invention is a system, method, and computer program product for automatic detection of elevated structures, such as bridges and overpasses, in three-dimensional (3D) Light Detection and Ranging (LIDAR) point clouds. The 3D point cloud is first processed with Random Sample Consensus (RANSAC) fitting a horizontal plane to a subset of points determined by multiple overlapping windows. RANSAC is an iterative method to estimate parameters of a mathematical model from a set of observed data which contains outliers and inliers as described by Fischler and Bolles in "Random Sample Consensus: A Paradigm for Model Fitting with Applications to Image Analysis and Automated Cartography" in Communications of the Association for Computing Machinery (ACM) 24: 381-395, June 1981, which is hereby incorporated by reference as though fully set forth herein. The points representing inliers are combined together into larger horizontal planar segments that might correspond to roads, streets, bridges, and roofs of large buildings. The detected segments are then filtered to remove small unconnected segments representing mostly roofs of the buildings and other uninteresting objects, with the goal being to detect structures such as bridges, ramps, and overpasses. Each of the remaining planar segments is transformed into a set of level images for further processing. An edge detector followed by a Hough transform is applied to the images to find elevated edges in the segment. Finally, the detection of the bridges and overpasses is completed by post-processing elevated edges found in the segment and linking them to determine presence of bridges, overpasses, and ramps. Each of these steps will be described in further detail below.

FIG. 1 is a block diagram summarizing the method of the present invention. The method consists of the following main steps which are carried out on a LIDAR point cloud data of a large area 100, or landscape (e.g., urban area). A LIDAR point cloud is a vector-based structure comprising a set of data points in a three-dimensional coordinate system created by LIDAR as described by Ronald G. Driggers in Encyclopedia of Optical Engineering, Volume 2, CRC Press, pgs. 2003-3104, which is hereby incorporated by reference as though fully set forth herein. The point cloud data may be acquired by airborne, ground LIDAR, or a mixture of both. Additionally, the point cloud should be large enough to cover bridges/overpasses and the areas around them.

In a first step 102 of the method, RANSAC-based segmentation of large flat extents (i.e., big horizontal and near-horizontal extents) occurs to generate large segments. The second step 104 is a post-processing clean-up of segments representing unrelated objects and objects that are not of interest, such as roofs of large buildings. In the third step 106, detection of elevated edges of the original segments occurs. In the final step 108, detection of elevated structures (e.g., bridges, overpasses, and ramps) from the 3D LIDAR data occurs.

Figure 2:
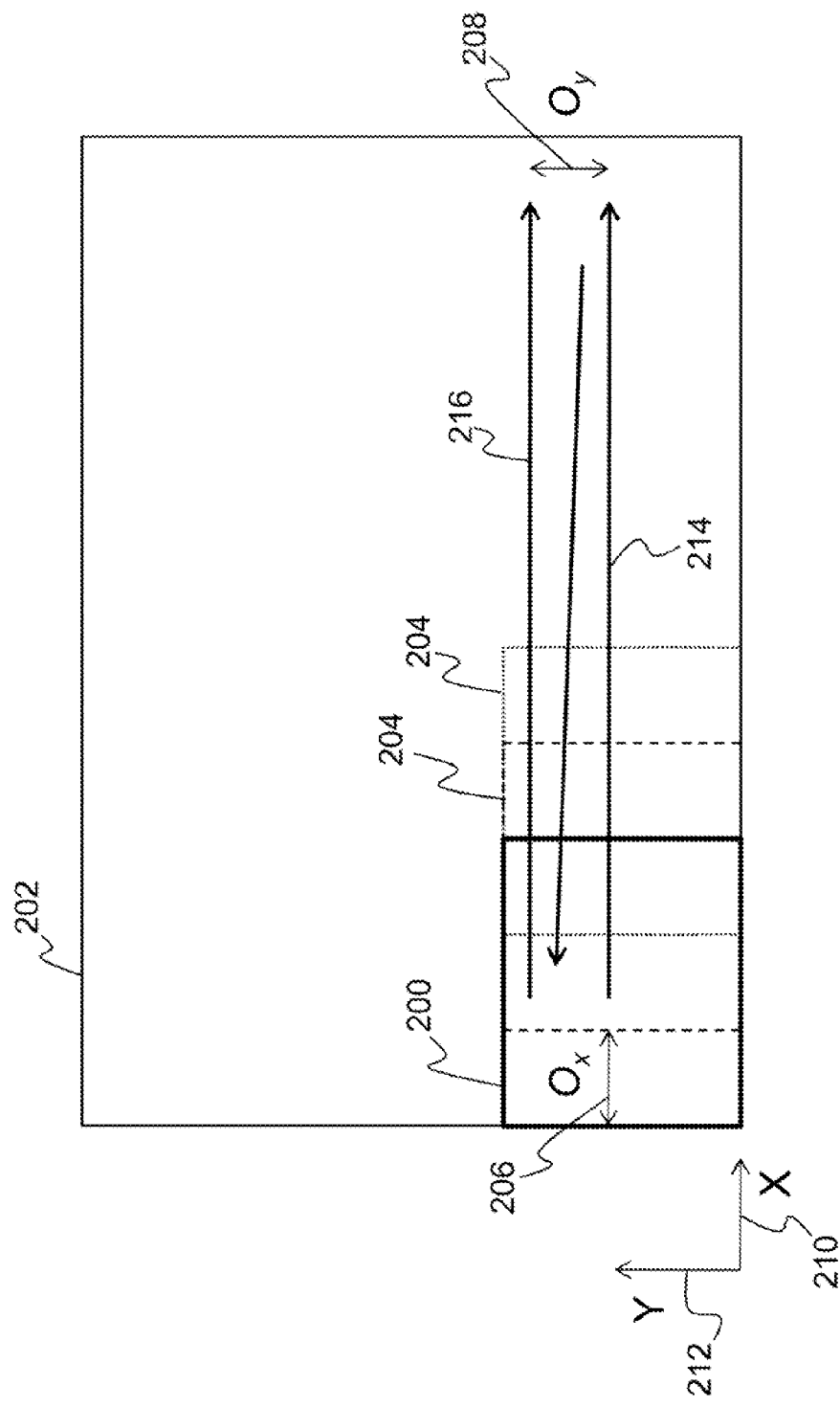
FIG. 2 is an illustration depicting processing with a sliding window according to the present invention.

FIG. 2 depicts processing of the point cloud using a sliding window. A large, parent point cloud is broken into several smaller point clouds. Each of the smaller point clouds is generated using a horizontally sliding window 200 that is raster scanned across the parent point cloud 202 (i.e., large point cloud extent) as shown in FIG. 2. Each of the smaller point clouds 204 overlaps adjacent point clouds, where 206 and 208 represent the overlaps along x 210 and y 212 coordinates. The process of applying the sliding window 200 to the data and creating a first row 214 of smaller point clouds 204 is shown in FIG. 2. Every new position of the sliding window 200 is shifted along coordinate x 210 by 206. When the first row 214 is processed, a second row 216 is started with the offset 208 along coordinate y 212. The process continues until the entire parent point cloud 202 is covered and processed.

As described above, a smaller point cloud is extracted for each sliding window position in the parent point cloud. Points inside the sliding window at x position i and y position j satisfy the following conditions:

·≤≤+,

≤≤+, where and are the sizes of the sliding window along coordinates x and y, respectively. Correspondingly, and are the coordinates of the bottom right corner of the window for the position (i,j).

The extracted subsets of the entire point cloud are processed with the RANSAC algorithm to find horizontal and near-horizontal planes representing streets, roads, bridges, overpasses, and other parts of motorable space. To reduce the amount of computations, the point clouds can be decimated, which provides significant computational speedup for dense point clouds that are often generated by ground LIDAR sensors and multiple scans.

Each plane found by RANSAC is filtered if it meets certain criteria. For instance, as a non-limiting example, the criteria may be that the number of inliers is greater than a predetermined threshold. The normal vector should be in a range defining the horizontal or near-horizontal orientation of that plane. A normal vector to the horizontal plane is defined as n=[x,y,z]=[0,0,1] or [0,0,−1]. The plane will meet the condition of the maximum incline if it is less than degrees, where a typical value of α is 10-15 degrees.

The RANSAC procedure is repeated for each of the smaller point clouds. The inliers are compared with the previously detected segments, and if the number of overlapping inliers is bigger than the predetermined threshold, all inliers are added to the list of points representing the previously detected segment. If no overlapping inliers are found, a new segment is created from the current inliers. This procedure finds horizontal or near-horizontal segments in the entire point cloud.

Figure 3:
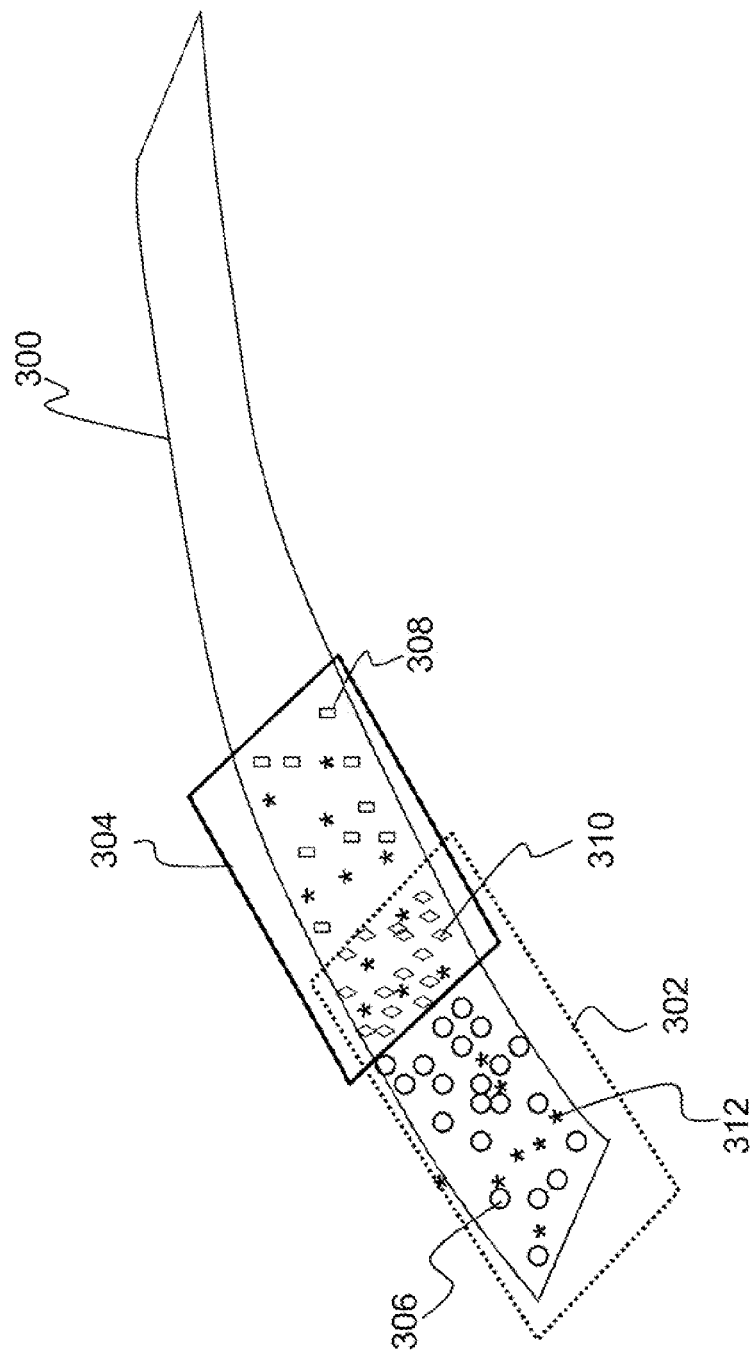
FIG. 3 is an illustration depicting a process of linking points into a flat horizontal extent according to the present invention.

The process of finding points on a bridge 300 with the aforementioned procedure is illustrated in FIG. 3. The sliding window procedure can be used to find not only planar objects, but also arch bridges and overpasses using an appropriate size for the sliding window and a maximum distance between a point and the plane. In addition to horizontal and near-horizontal segments, vertical segments, such as different types of building walls, can be extracted using constraints on the normal vector to the plane. FIG. 3 illustrates a first plane (plane i 302) and a second plane (plane i+1 304) of the bridge 300. Circles 306 represent inliers for plane i only. Rectangles 308 represent inliers for plane i+1 only. Diamonds 310 represent inliers for both plane i and plane i+1. Stars 312 represent outliers within plane i and plane i+1. The example depicted in FIG. 3 shows how the segment of the points is accumulated from one sliding window position to another. The segment will grow in all directions where the system finds sufficient number of points that belong to a horizontal or near-horizontal plane.

Figure 4:
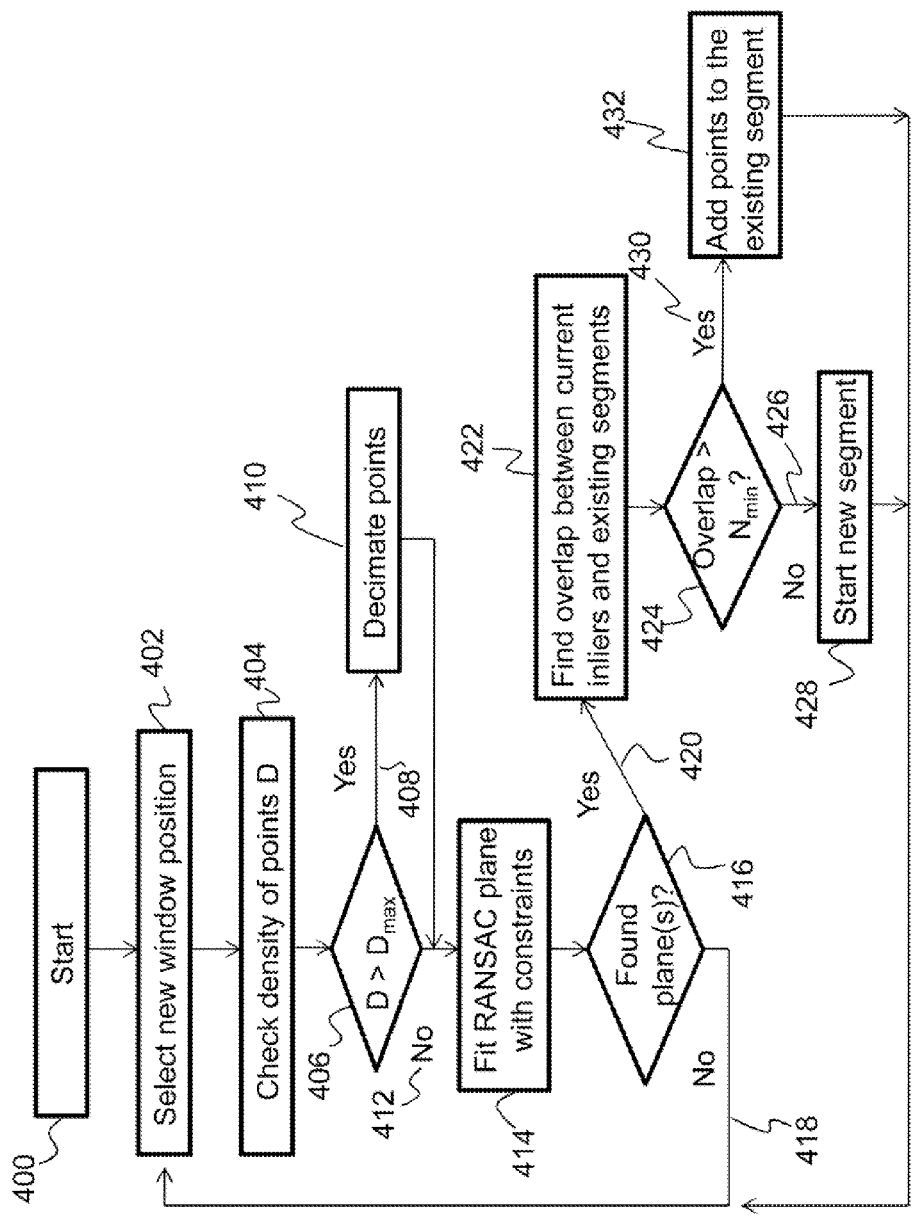
FIG. 4 is a flow diagram of a segmentation procedure according to the present invention.

A flow diagram of the segmentation procedure described above is shown in FIG. 4. The system starts 400 and selects a new sliding window position 402 in the point cloud. The system then checks the density of the points D 404 within the sliding window and compares D to a predetermined $D_{max}$ 406. If D is greater than a predetermined $D_{max}$ 408, then the points are decimated 410. If D is not greater than $D_{max}$ 412, then the RANSAC plane is fit with constraints 414. The constraints select only horizontal or near horizontal planes with normal vector 10-15 degrees deviation from the vertical direction, as described above. Furthermore, after the points are decimated 410, the process continues to fitting the RANSAC plane with constraints 414. Next, the system determines if a plane has been found 416. If a plane is not found 418, the system returns to the step of selecting a new window position 402. If a plane is found 420, the system finds overlap(s) between current inliers and existing segments 422. The system then determines whether the overlap found is greater than a predetermined $N_{min}$ 424, where $N_{min}$ represents a minimum number of inliers. If the overlap is not greater than $N_{min}$ 426, then a new segment is started 428. If the overlap is greater than $N_{min}$ 430, points are added to the existing segment 432.

Figure 5:
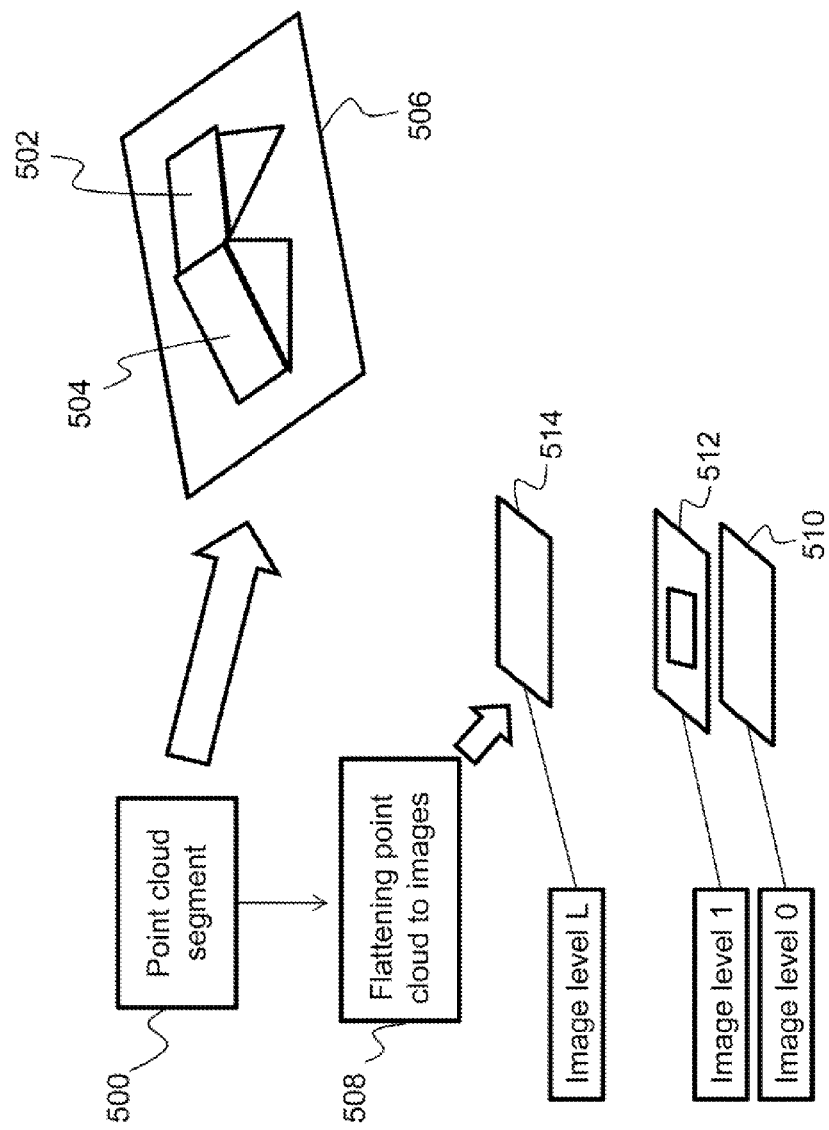
FIG. 5 is an illustration depicting converting three-dimensional point clouds to images according to the present invention.

After the segmentation is complete, all segments are converted to images (i.e., image levels) for further processing and clean-up. An example of this procedure is shown in FIG. 5. A point cloud segment 500 contains a typical scenario of a bridge 502 with a connected ramp 504 on the ground 506. Each point cloud segment 500 is flattened into a set of images 508: image level 0 510, image level 1 512, and up to some image level L 514. For simplicity, it can be assumed that each pixel in the image levels has the same user-selected spatial resolution. The pixel represents average height of the points for the corresponding level. The number of levels depends on the maximum number of overlapping parts of the segments. For example, when points are combined into the segment, some parts of the bridges and overpasses will be above each other and belong to the same segment. To avoid collapsing the points and losing the structural information, points that have other points below are placed into a separate image, called level n+1, where n is the level of the points below. FIG. 5 shows the example of a bridge point cloud that creates two levels (image level 0 (corresponding to the ramp 504) and image level 1 (corresponding to the ground 506)) due to the presence of points below the bridge 502. This is a typical situation when the points are collected from a side of the bridge and/or multiple sensor positions.

Figure 6:
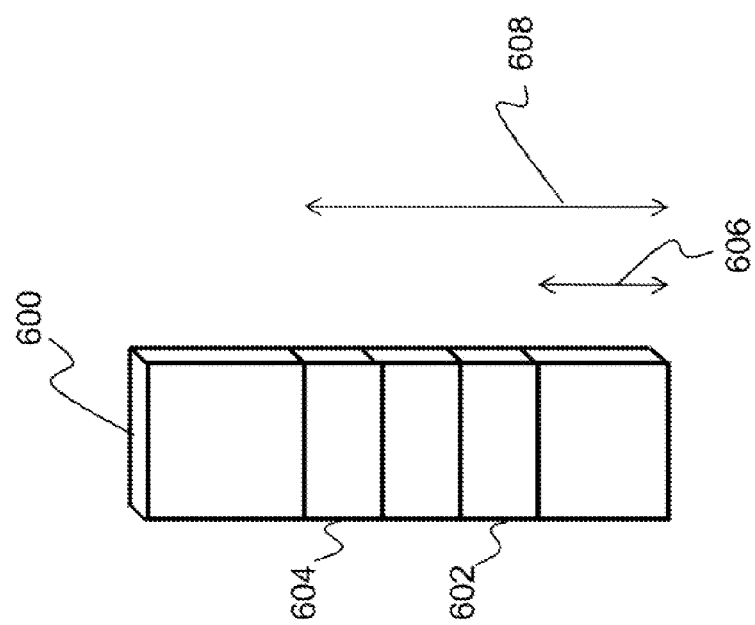
FIG. 6 is an illustration of a vertical strip for an area with two levels corresponding to one pixel according to the present invention.

The process of creating image levels can be further demonstrated using a vertical strip for an area corresponding to a particular pixel in any of the level images. An example of a vertical strip 600 for a pixel (n, m) with two levels (level 0 602 and level 1 604) is shown in FIG. 6. If the area does not have any points, the intensity of the corresponding pixel is zero. The lowest ground point corresponds to level 0 602. Arrows 606 and 608 indicate the height from the ground for level 0 602 and level 1 604, respectively. Such convention separates areas with no points from areas with the lowest and other points. The process of converting the average height h of the points into pixel intensity I can be written as:

=−+1, where is the minimum global height of the points for the given segment, and L is the highest level of pixel intensity plus one, or just a scaling factor, to limit the range pixel intensities for further processing.

Figure 7:
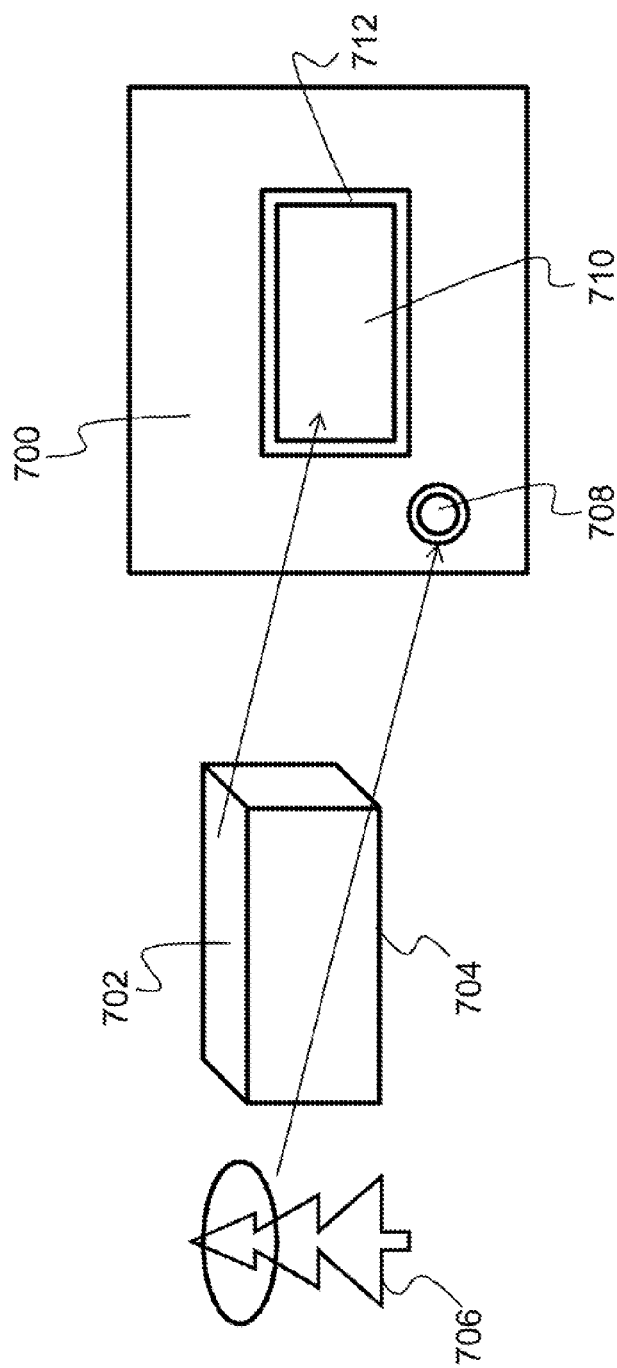
FIG. 7 is an illustration depicting post-processing clean-up to remove unconnected segments according to the present invention.

After segmentation, post-processing clean-up is necessary to remove small and unconnected segments corresponding to, for example, roofs of buildings and other unrelated objects. There are several criteria that are used in the post-processing clean-up process: minimum area and discontinuity. An example of the post-processing clean-up process is illustrated in FIG. 7. A segment 700 with two parts is created by a roof 702 of a building 704 and a tree 706 next to it. The segment 700 produces a single image level with two blobs 708 and 710. The blob 708 from the tree 706 can be removed by an area filter which removes blobs smaller than an area specified (i.e., minimum area criteria). The larger blob 710 representing the roof 702 can be removed using discontinuity criteria, as described below.

Edge detection is a tool aimed at identifying points in a digital image at which the image brightness has discontinuities (i.e., changes sharply). The present invention uses a well-known Canny edge detector followed by the Hough transform to vectorize the edges. A description of the Canny edge detector is presented by Canny, J. in "A Computational Approach to Edge Detection" in Institute of Electrical and Electronics Engineers (IEEE) Transactions of Pattern Analysis and Machine Intelligence, 8(6): 679-698, 1986, which is hereby incorporated by reference as though fully set forth herein. A description of the Hough transform is presented by Duda and Hart in "Use of the Hough Transformation to Detect Lines and Curves in Pictures" in Communications of ACM, Vol. 15, pp. 11-15, 1972, and by Hough in Machine Analysis of Bubble Chamber Pictures, Proceedings of the International Conference on High Energy Accelerators and Instrumentation, 1959, which are hereby incorporated by reference as though fully set forth herein. The detection of edges is applied to each of the image levels. In the example depicted in FIG. 7, the roof 702 produces edges 712 along the perimeter of the blob 710 with no smooth connection to the ground, streets, and roads. This criterion is used to eliminate such segments stemming from roofs.

Figure 8:
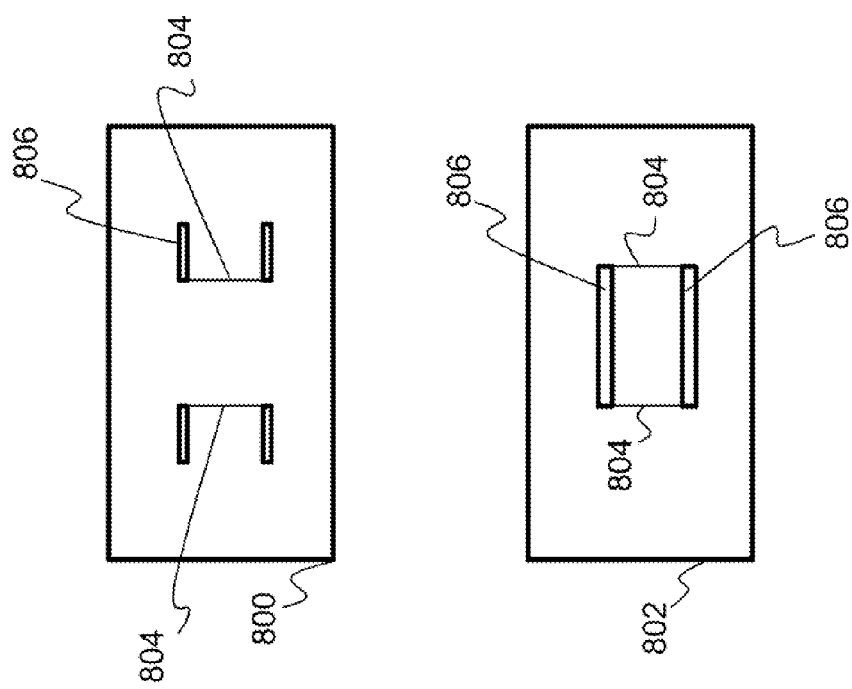
FIG. 8 is an illustration of two image levels detecting elevated edges for a bridge with points under it according to the present invention.

Consider an example with a bridge similar to the one shown in FIG. 5. As shown in FIG. 8, if the bridge contains LIDAR points under it, two image levels, image level 0 800 and image level 1 802, are generated. Lines and rectangles represent the detected edges in the image levels. Lines 804 represent detected edges with no elevation differences in the point cloud data and are excluded from further analysis. Rectangles 806 represent elevations of the original point cloud segment that are typical for bridges, overpasses and the ramps. The elevated edges are kept for further processing.

Figure 9:
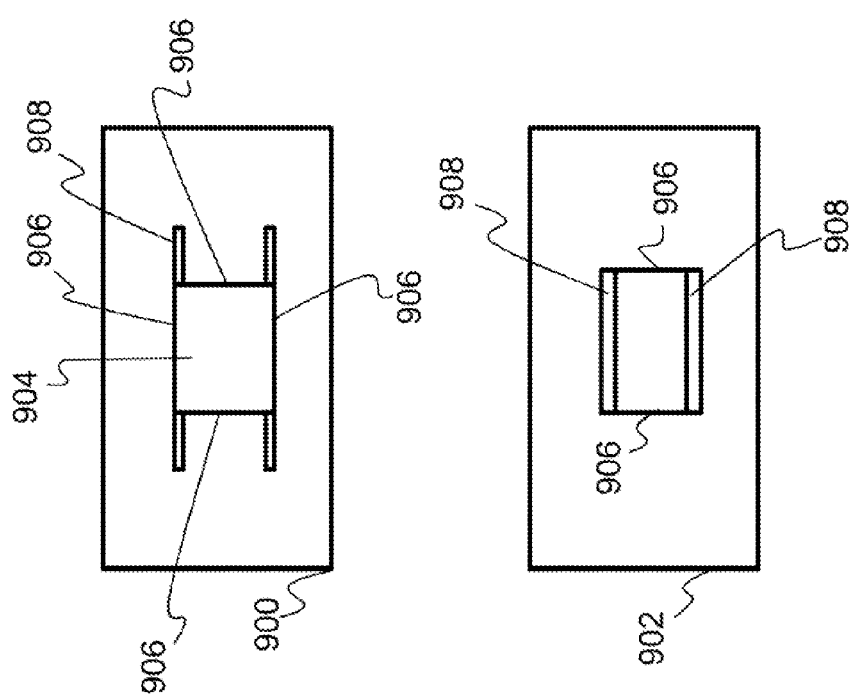
FIG. 9 is an illustration of two image levels detecting elevated edges for a bridge with no points under it according to the present invention.

A situation where in a bridge contains no points under it is illustrated in FIG. 9, which includes two level images: an image level 0 900 and an image level 1 902. Image level 0 includes a representation of a no points area 904. The rectangles and lines also represent the detected edges in image level 0 900 and image level 1 902. Lines 906 are removed from further processing, because there are no data points on one side of the edge. Rectangles 908 represent the real elevations in the data and will be kept for further processing.

Figure 10:
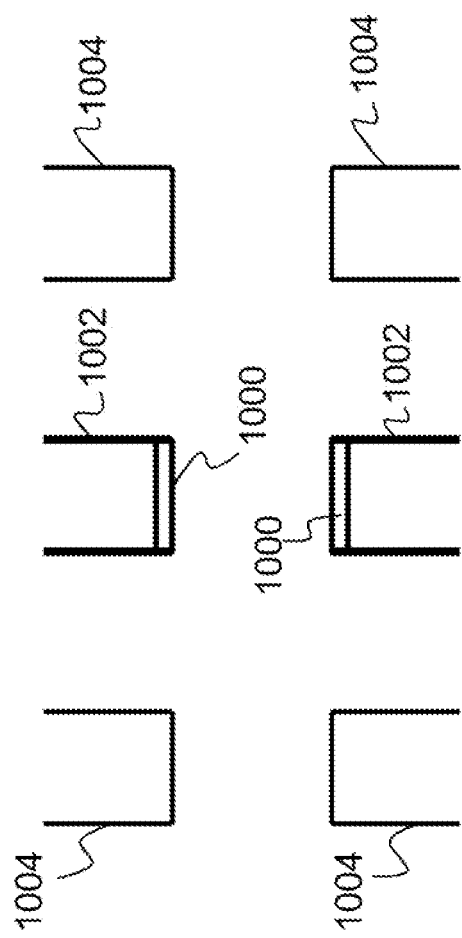
FIG. 10 is an illustration depicting elevated structure detection according to the present invention.

A non-limiting example of detected elevated parts of a segment representing a bridge/overpass in a landscape (e.g., urban area) is shown in FIG. 10. Rectangles 1000 represent the bridge. Lines 1002 represent possible other elevations of the extent (e.g., ramps) found in this area. All other edges are depicted by lines 1004 and are removed from further processing, because they do not represent the elevation of the extent in these edges.

Figure 11:
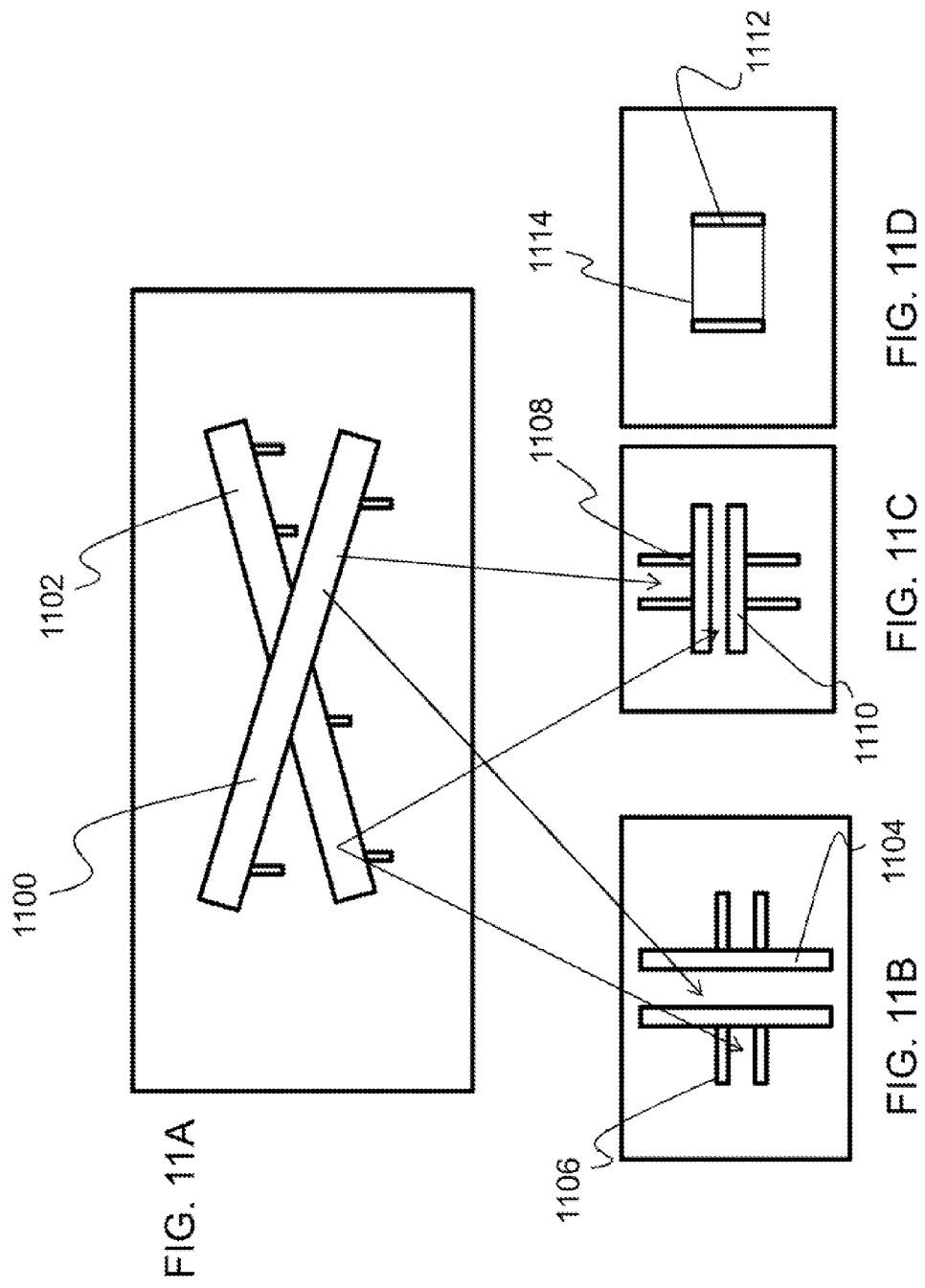
FIG. 11 is an illustration depicting multi-level overpass detection according to the present invention.

An example of a multi-level overpass having an upper level 1100 and a lower level 1102 is shown in FIG. 11A. If no points are collected under the upper level 1100 on the lower level 1102, the level image will look like FIG. 11B. FIG. 11B depicts a first set 1104 of elevated edges above a second set 1106 of elevated edges to represent the upper level 1100 and lower level 1102, respectively, of the multi-level overpass. If points were collected on the lower level 1102 under the upper level 1100, two level images shown in FIG. 11C and FIG. 11D are produced. In FIG. 11C, a first set 1108 of elevated edges above a second set 1110 of elevated edges represent the lower level 1102 and upper level 1100, respectively. In FIG. 11D, the rectangles 1112 represent edges of interest and the lines 1114 will be discarded from the analysis.

The final step of the method of the present invention is to link the elevated edges into the elevated structures (e.g., bridges). The straight edges that meet the requirements described above are converted into intervals, where each interval is determined by two points. This process is called vectorization of edges. The rest of the procedure is accomplished by analysis of the location of the vectorized edges and their orientations relative to each other. The following conditions must be met for the final detection. First, the two edges must be close to each other; the distance between the two edges cannot exceed the maximum width of the bridge. Second, the two edges must be near parallel with a specified angle tolerance, such as 5-10 degrees, depending on amount of noise in the data. Third, the two edges should form a quadrangle close to a rectangle with a specified tolerance. As a non-limiting example of a specified tolerance, the length of the diagonals should not differ more than between five and ten percent. Furthermore, the present invention works on curved overpasses with some modifications of the edge vectorization mechanism. For instance, the edges of curved parts of overpasses can be considered as piece-wise.

Figure 12:
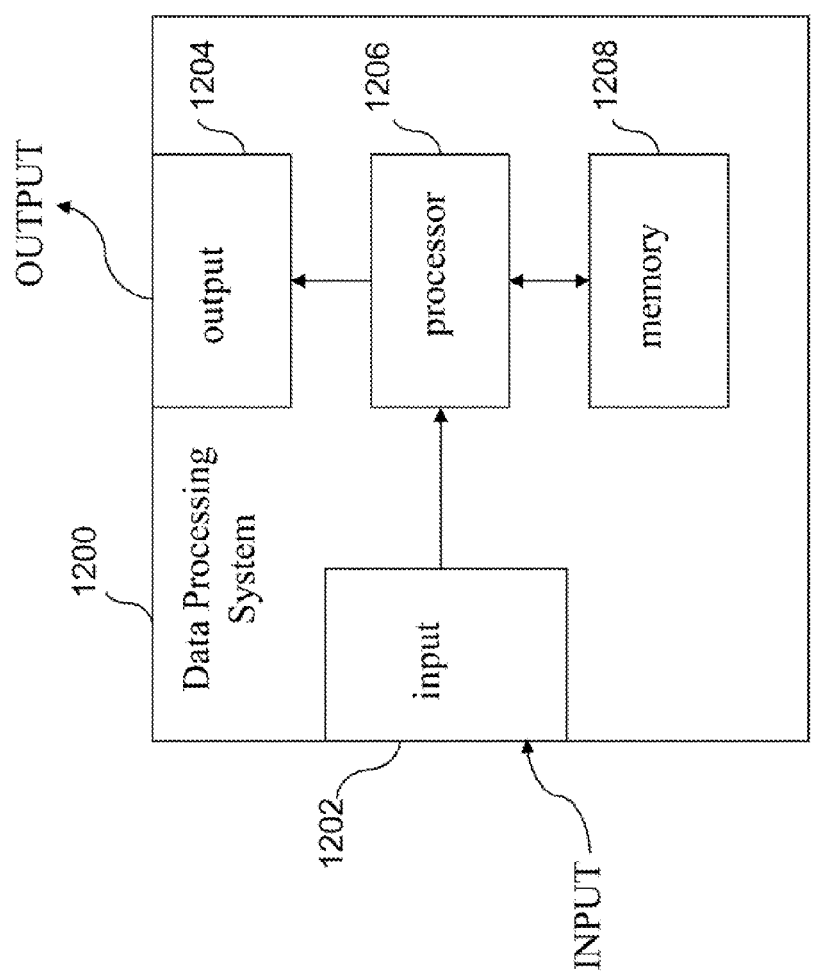
FIG. 12 is an illustration of a data processing system according to the present invention.

FIG. 12 illustrates a block diagram depicting components of a data processing system 1200 (e.g., computer) incorporating the operations of the method described above and throughout the specification. The method utilizes a data processing system 1200 for storing computer executable instructions (or instruction means) for causing a processor to carry out the operations of the above described method. The data processing system 1200 comprises an input 1202 for receiving information from a user. Information received may include input from devices such as cameras, scanners, keypads, keyboards, microphone, other peripherals such as storage devices, other programs, etc. The input 1202 may include multiple "ports." An output 1204 is connected with a processor 1206 (or processors) for providing information for transmission to other data processing systems, to storage devices, to display devices such as monitors, to generating information necessary for delivery, and to other mechanisms for presentation in user-usable forms. The input 1202 and the output 1204 are both coupled with the processor 1206, which may be a general-purpose computer processor or a specialized processor designed specifically for use with the present invention. The processor 1206 is coupled with a memory 1208 to permit storage of data and software to be manipulated by commands to the processor 1206. The memory 1208 includes instructions such that when the instructions are executed, the processor 1208 (or processors) performs operations described above and throughout the specification.

Figure 13:
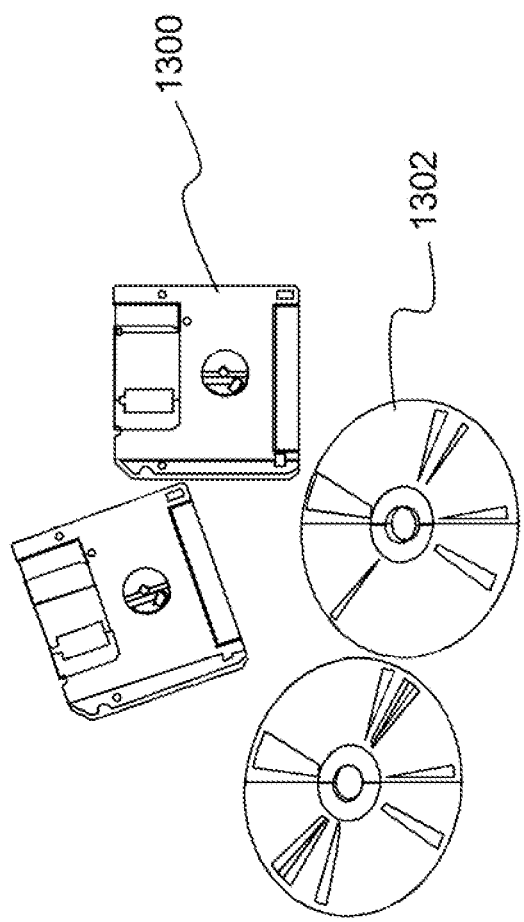
FIG. 13 is an illustration of a computer program product according to the present invention.

An illustrative diagram of a computer program product embodying the present invention is depicted in FIG. 13. As a non-limiting example, the computer program product is depicted as either a floppy disk 1300 or an optical disk 1302. However, as mentioned previously, the computer program product generally represents computer readable code (i.e., instruction means or instructions) stored on any compatible computer readable medium.

While the present invention is described using point cloud data generated by LIDAR, it can be appreciated by one skilled in the art that the system and method described herein is applicable to programs that also utilize 3D point cloud data generated by time-of-flight imagers, laser scanners, stereo imagers, or any other suitable sensor for sensing and automated understanding of 3D environments. As a non-limiting example, vehicles may use LIDAR to enable autonomous driving or flight modes. The present invention could be used to allow systems to automatically recognize bridges/overpasses for acquisition and updating of datasets for autonomous navigation or for mission planning and situational awareness. Another application is reduction of the workload for humans analyzing LIDAR data of urban regions for military mission planning and surveillance applications. Furthermore, awareness and understanding of vehicle surroundings is critical for driver assistance and avoiding accidents. Therefore, this invention is applicable to any applications that need intelligent 3D sensing systems.

What is claimed is:

1. A system for detecting elevated structures using three-dimensional point cloud data, the system comprising:
   one or more processors and a memory having instructions such that when the instructions are executed, the one or more processors perform operations of:
      receiving a set of data from a three-dimensional point cloud of a landscape, wherein the set of data points comprises inlier data points and outlier data points;
      identifying the inlier data points in the three-dimensional point cloud data;
      combining the inlier data points into a plurality of segments, wherein each segment in the plurality of segments represents a planar, horizontal or near-horizontal extent in the three-dimensional cloud data;
      filtering the plurality of segments to generate a plurality of filtered segments, the plurality of filtered segments having overlapping parts;
      converting each of the filtered segments into an image comprising one or more horizontal image levels, wherein the number of image levels depends on a maximum number of overlapping parts of the filtered segments;
      processing each image level with an edge detection algorithm to detect elevated edges in the filtered segments; and
      vectorizing the elevated edges to identify a multi-level elevated structure of interest in the landscape wherein, the multi-level elevated structure of interest is selected from the group consisting of bridges, overpasses, and ramps.

2. The system for detecting elevated structures as set forth in claim 1, wherein the system further performs an operation of:
   dividing the three-dimensional point cloud into a plurality of small point clouds using a sliding window that shifts along the three-dimensional point cloud to produce a new sliding window position:
      wherein each of the small point clouds overlaps with at least one adjacent small point cloud;
      wherein the three-dimensional point cloud comprises an x coordinate and a y coordinate, and Ox and Oy represent overlaps between adjacent small point clouds along the x coordinate and the y coordinate, respectively;
      wherein each new sliding window position is shifted along the x coordinate by Ox; and
      wherein each new sliding window position is shifted along the y coordinate by Oy until the entire three-dimensional point cloud is processed.

3. The system for detecting, elevated structures as set forth in claim 2, wherein the system further performs operations of:
   determining a density of data points D in each new sliding window position of a small point cloud;
   comparing the density of data points D to a predetermined threshold, such that when the density of data points D exceeds the predetermined threshold, the small point cloud is decimated;
   processing the data points in each new sliding window position with a random sample consensus (RANSAC) algorithm to detect at least one plane comprising current inlier data points; and
   determining whether an overlap exists between the current inlier data points and the inlier data points of a segment in the plurality of segments, producing overlapping inlier data points.

4. The system for detecting elevated structures as set forth in claim 3, wherein the system further performs an operation of adding the current inlier data points to a segment in the plurality of segments when the number of overlapping inlier data points is greater than a predetermined threshold.

5. The system for detecting elevated structures as set forth in claim 3, wherein the system further performs an operation of creating a new segment from the current inlier data points when the number of overlapping inlier data points is less than a predetermined threshold.

6. The system for detecting elevated structures as set forth in claim 1, wherein the system further performs an operation of filtering a segment in the plurality of segments when the segment is smaller than a predetermined threshold. Or discontinuous, wherein segments that are smaller than the predetermined threshold or discontinuous do not represent elevated structures of interest in the landscape.

7. A computer-implemented method for detecting elevated structures, comprising an act of causing a data processor to execute instructions stored on a memory such that upon execution, the data processor performs operations of:
   receiving a set of data from a three-dimensional point cloud of a landscape, wherein the set of data points comprises inlier data points and outlier data points;
   identifying the inlier data points in the three-dimensional point cloud data;
   combining the inlier data points into a plurality of segments, wherein each segment in the plurality of segments represents a planar, horizontal or near-horizontal extent in the three-dimensional cloud data;

filtering the plurality of segments to generate a plurality of filtered segments, the plurality of filtered segments having overlapping parts;

converting each of the filtered segments into an image comprising one or more horizontal image levels, wherein the number of image levels depends on a maximum number of overlapping parts of the filtered segments;

processing each image level with an edge detection algorithm to detect elevated edges in the filtered segments; and vectorizing the elevated edges to identify a multi-level elevated structure of interest in the landscape, wherein the multi-level elevated structure of interest is selected from the group consisting of bridges, overpasses, and ramps.

8. The method for detecting elevated structures as set forth in claim 7, further comprising an act of causing a data processor to perform an operation of:

dividing the three-dimensional point cloud into a plurality of small point clouds using a sliding window that shifts along the three-dimensional point cloud to produce a new sliding window position;

wherein each of the small point clouds overlaps with at least one adjacent small point cloud;

wherein the three-dimensional point cloud comprises an x coordinate and a y coordinate, and Ox and Oy represent overlaps between adjacent small point clouds along the x coordinate and the y coordinate, respectively;

wherein each new sliding window position is shifted along the x coordinate by Ox; and wherein each new sliding window position is shifted along the y coordinate by Oy until the entire three-dimensional point cloud is processed.

9. The method for detecting elevated structures as set forth in claim 8, further comprising an act of causing a data processor to perform operations of:

determining a density of data points D in each new sliding window position of a small point cloud;

comparing the density of data points D to a predetermined threshold, such that when the density of data points D exceeds the predetermined threshold, the small point cloud is decimated;

processing the data points in each new sliding window position with a random sample consensus (RANSAC) algorithm to detect at least one plane comprising current inlier data points; and determining whether an overlap exists between the current inlier data points and the inlier data points of a segment in the plurality of segments, producing overlapping inlier data points.

10. The method for detecting elevated structures as set forth in claim 9, further comprising an act of causing a data processor to perform an operation of adding the current inlier data points to a segment in the plurality of segments when the number of overlapping inlier data points is greater than a predetermined threshold.

11. The method for detecting elevated structures as set forth in claim 9, further comprising an act of causing a data processor to perform an operation of creating a new segment from the current inlier data points when the number of overlapping inlier data points is less than a predetermined threshold.

12. The method for detecting elevated structures as set forth in claim 7, further comprising an act of causing a data processor to perform an operation of filtering a segment in the plurality of segments when the segment is smaller than a predetermined threshold or discontinuous, wherein segments that are smaller than the predetermined threshold or discontinuous do not represent elevated structures of interest in the landscape.

13. A computer program product for detecting elevated structures, the computer program product comprising:

computer-readable instruction means stored on a non-transitory computer-readable medium that are executable by a computer having a processor for causing the processor to perform operations of:

receiving a set of data from a three-dimensional point cloud of a landscape, wherein the set of data points comprises inlier data points and outlier data points;

identifying the inlier data points in the three-dimensional point cloud data;

combining the inlier data points into a plurality of segments, wherein each segment in the plurality of segments represents a planar, horizontal or near-horizontal extent in the three-dimensional cloud data;

filtering the plurality of segments to generate a plurality of filtered segments, the plurality of filtered segments having overlapping parts;

converting each of the filtered segments into an image comprising one or more horizontal image levels, wherein the number of image levels depends on a maximum number of overlapping pans of the filtered segments;

processing each image level with an edge detection algorithm to detect elevated edges in the filtered segments; and vectorizing the elevated edges to identify a multi-level elevated structure of interest in the landscape, wherein the multi-level elevated structure of interest is selected from the group consisting of bridges, overpasses, and ramps.

14. The computer program product for detecting elevated structures as set in claim 13, further comprising instruction means for causing a processor to perform an operation of:

dividing the three-dimensional point cloud into a plurality of small point clouds using a sliding window that shifts along the three-dimensional point cloud to produce a new sliding window position;

wherein each of the small point clouds overlaps with at least one adjacent small point cloud;

wherein the three-dimensional point cloud comprises an x coordinate and a y coordinate, and Ox and Ox represent overlaps between adjacent small point clouds along the x coordinate and the y coordinate, respectively;

wherein each new sliding window position is shifted along the x coordinate by Ox; and wherein each new sliding window position is shifted along the y coordinate by Oy until the entire three-dimensional point cloud is processed.

15. The computer program product for detecting elevated structures as set forth in claim 14, further comprising instruction means for causing a processor to perform operations of:

determining a density of data points D in each new sliding window position of a small point cloud;

comparing the density of data points D to a predetermined threshold, such that when the density of data points D exceeds the predetermined threshold, the small point cloud is decimated;

processing the data points in each new sliding window position with a random sample consensus (RANSAC) algorithm to detect at least one plane comprising current inlier data points; and determining whether an overlap exists between the current inner data points and the inlier data points of a segment in the plurality of segments, producing overlapping inner data points.

16. The computer program product for detecting elevated structures as set forth in claim 15, further comprising instruction means for causing a processor to perform an operation of adding the current inlier data points to a segment in the plurality of segments when the number of overlapping inlier data points is greater than a predetermined threshold.

17. The computer program product for detecting elevated, structures as set forth in claim 15, further comprising instruction means for causing a processor to perform an operation of creating a new segment from the current inlier data points when the number of overlapping inlier data points is less than a predetermined threshold.

18. The computer program product for detecting elevated structures as set forth in claim 13, filtering a segment in the plurality of segments when the segment is smaller than a predetermined threshold or discontinuous, wherein segments that are smaller than the predetermined threshold or discontinuous do not represent elevated structures of interest in the landscape.

* * * * *